United States Patent [19]

Devore et al.

[11] 4,081,844

[45] Mar. 28, 1978

[54] INTERLEAVED SYNCH AND BEGINNING OF DATA INDICATORS

[75] Inventors: Ernest William Devore; Judson Allen McDowell, both of Boulder, Colo.

[73] Assignee: International Business Machines Corporation, Armonk, N.Y.

[21] Appl. No.: 710,832

[22] Filed: Aug. 2, 1976

[51] Int. Cl.² .............................................. G11B 5/09
[52] U.S. Cl. ........................................ 360/48; 360/50
[58] Field of Search ....................... 360/50, 49, 48, 51

[56] References Cited

U.S. PATENT DOCUMENTS 3,641,526  2/1972  Bailey et al. ........................... 360/48

4,001,883  1/1977  Strout ..................................... 360/48

*Primary Examiner*—Vincent P. Canney
*Attorney, Agent, or Firm*—Herbert F. Somermeyer

[57] ABSTRACT

Each data record portion on a record member includes preamble signals for synchronizing recording apparatus with respect to data signals recorded in juxtaposition to the preamble signals. A plurality of beginning of data indicators are interleaved in the synchronizing signals for providing a plurality of independent but coacting beginning of data location pointers. Enhanced apparatus includes means responsive to any one of the location pointers to ensure a reliable start of data indication.

9 Claims, 10 Drawing Figures

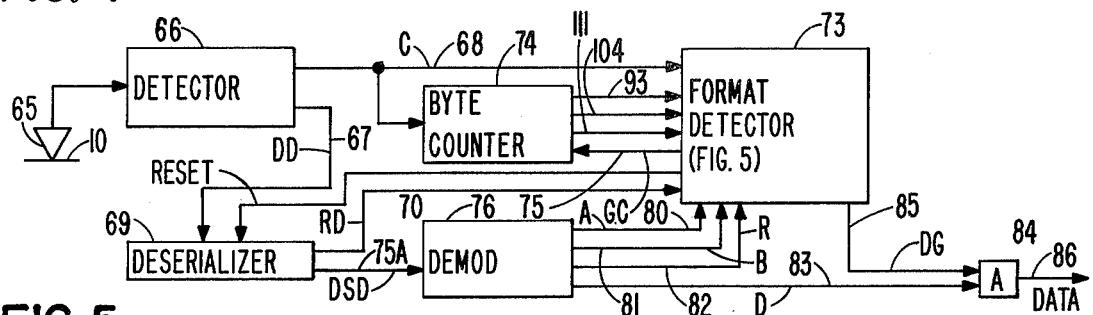

INTERLEAVED SYNCH AND BEGINNING OF DATA INDICATORS

DOCUMENTS INCORPORATED BY REFERENCE

U.S. Pat. No. 3,641,526 shows a resynchronization apparatus and a signal usable as a resynchronization marker signal in connection with practicing the present invention.

U.S. Pat. No. 28,265 shows a multi-track recorder using resynchronization. The present invention can be incorporated into the patent illustrated apparatus.

U.S. Pat. No. 3,860,907 shows a readback system with which the present invention may be employed.

BACKGROUND OF THE INVENTION

The present invention relates to data signal recording apparatus particularly of the magnetic type and directed to enhancement of preamble or synchronizing signals associated with a leading edge of a recorded data record.

Magnetic recording apparatus, particularly for use with data processing systems, have employed diverse record members and diverse recording and readback apparatus. Most record members have provisions for receiving a plurality of data records. Generally, each data record area is preceded by a set of synchronizing signals for synchronizing readback apparatus for accurately sensing the recorded data record. Such synchronizing signals precede the data transducing operation, hence are termed preamble signals. Such preamble signals are disposed only on one side of each data record for those recording apparatus always scanning the record in the same direction. Such apparatus include magnetic disk apparatus, many magnetic card apparatus, magnetic strips, storage drums, and helical scan magnetic recorders. Some magnetic recording apparatus can scan each data record in either direction. As an example, most magnetic tape units can read in both directions. In such a situation such preamble signals are located at each end of the data record area. In one-half inch tape recorders, for example, the direction of writing is always in the same direction and is termed a forward direction. In such apparatus, the leading portion for recording purposes includes synchronizing signals called a preamble, while signals at the opposite end of the data record area are termed a postamble. In any event, most recording apparatus, particularly those recording apparatus for higher density data recording, employ preamble synchronizing signals for ensuring reliable readback.

All of the synchronizing signals have a marker signal denominating the separation between the synchronizing signals and the data signals. Such a marker signal is necessary to precisely define the beginning of data. It turns out that when reading magnetic records, it is not possible to precisely indicate when synchronizing signals begin. Therefore, it is not possible to rely on counting synchronizing signals for identifying beginning of data.

The single beginning of data mark can take any one of many forms, usually includes a long wave length. With the advent of ever-increasing data recording densities, the areal extent of such a marking signal becomes increasingly small, hence, increasingly susceptible to recording error conditions resulting in missing a beginning a data point. If this one marker signal becomes obliterated or unreadable for one reason or another, all of the data recording in the data record area associated with such marker signal, can become irretrievable. Such loss of data signals should be avoided.

SUMMARY OF THE INVENTION

It is an object of the present invention to provide a beginning of data indicating system insensitive to signal dropouts at a plurality of locations while providing the functions with a minimal overhead and cost in recorder apparatus.

A magnetic recording article or other form of recorded article employs beginning of record location pointers in a preamble having synchronizing signals disposed immediately adajcent the beginning of record location. The preamble has a plurality of unique marker signals or indicators interleaved in the synchronizing signals at spaced apart locations which independently and as well as cooperatively indicate a beginning of record location.

Recording apparatus employing the invention and adapted to operate with the inventive article, includes circuit or program means for generating a resynchronization signal plus means for generating a marker signal for generating a beginning of data pointer signal. The circuit or program means generate a plurality of independent pointer signals which independently point to the beginning of data.

In a preferred form of the invention, each beginning of data indicator includes a leading resynchronization signal pattern followed by a plurality of marker indicating signals, the combinations of the plurality of unique marker indicating signals respectively and independently signify the beginning of data. In a constructed embodiment, three beginning of data indicators were employed, having a resynchronization signal R, a first marker signal A and a second marker signal B. The preamble was constituted by an initial burst of synchronizing signals followed by a beginning of data indicator consisting of the signals RAA in that order. A set of synchronizing signals were interleaved between a first and second data indicators. The second data indicator consists of the resynchronizing signal R followed by two B marker signals, also uniquely signifying the precise beginning of data location. The second data indicator is followed by a set of synchronizing signals and then the beginning of data indicator itself, which consists of a resynchronization signal R, an A marker signal and a B marker signal.

Recording apparatus includes a synchronizing signal counter for precisely locating the beginning of data indicators and a logic system for determining where to record the beginning of data indicators.

A readback apparatus employing the present invention includes means for detecting the beginning of data indicators and error compensating means for recovery from a missed beginning of data indicator such that beginning of data is reliably indicated irrespective of a plurality of the beginning of data indicators being obliterated. The readback apparatus detects the resynchronization and marker signals independently. A decoder decodes the sequence for identifying which beginning of data indicator is being read. A set of controlled triggers interact with the decoder and between themselves to ensure proper detection of beginning of data. An exlusive OR circuit constitutes circuit means of the error compensating means for accommodating obliterated beginning of data indicators. Such exclusive OR circuit operates with marker indicating triggers for readjusting same to indicate beginning of data at the appropriate time.

The foregoing and other objects, features and advantages of the invention will be apparent from the following more particular description of preferred embodiments of the invention, as illustrated in the accompanying drawings.

THE DRAWING

FIG. 4 is a block diagram of a readback portion of a signal recorder employing the present invention.

FIG. 5 is a block signal diagram of a format detector usable with the FIG. 4 illustrated readback circuits for illustrating the operation of the invention with respect thereto.

FIGS. 6 through 10 are idealized wave forms for illustrating the operation of the FIG. 5 illustrated circuits under various error-free conditions with respect to missing beginning of data indicators.

DETAILED DESCRIPTION

Figure 1:
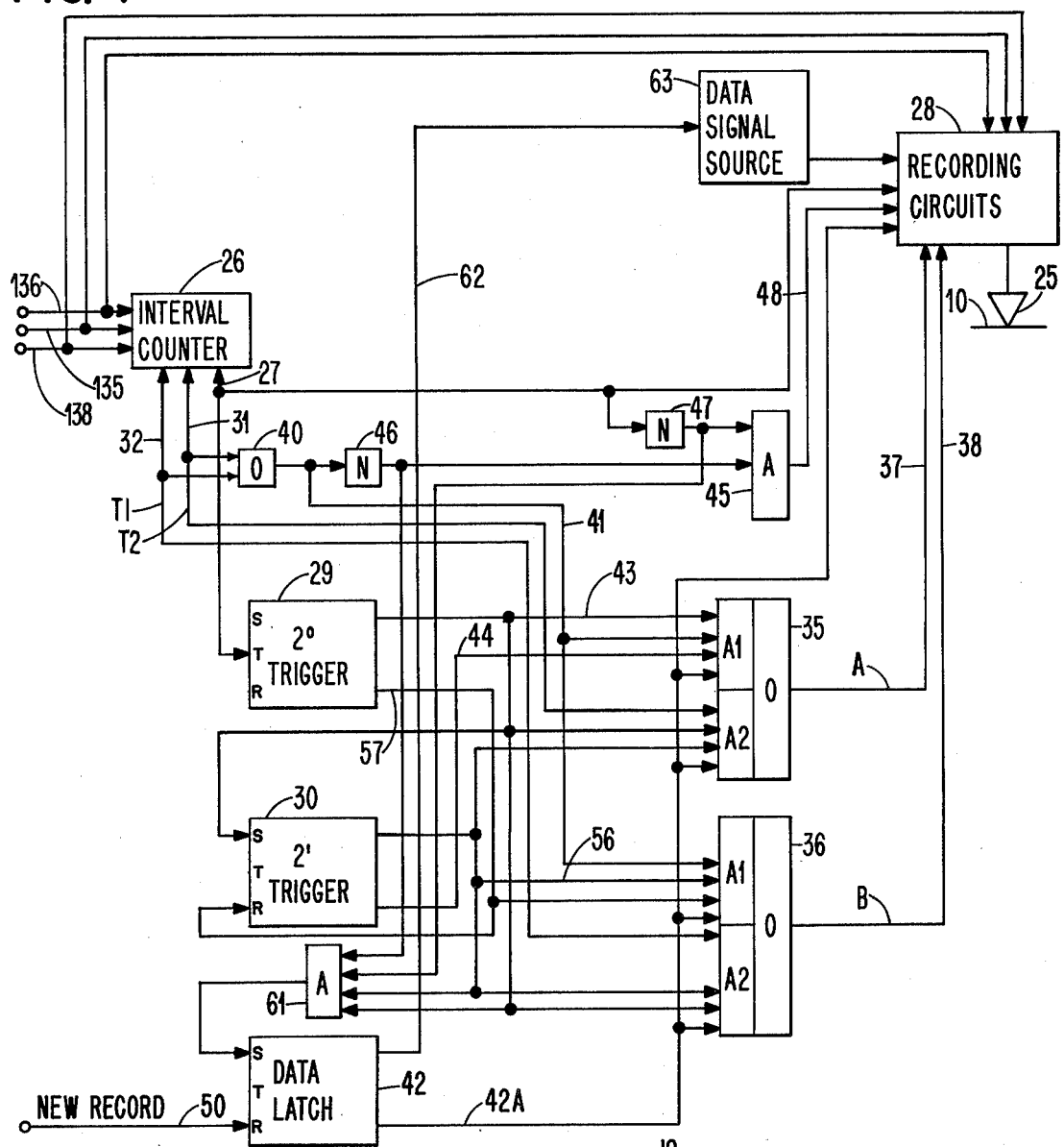
FIG. 1 is a schematic block diagram of recording apparatus employing the present invention.

Referring now more particularly to the drawing, like numerals indicate like parts and structural features in the various diagrammatic showings. The data signal record on a record medium 10 includes a data signal recording portion 11 preceded by a preamble 12. Preamble 12 consists of several independent portions. A first portion includes a plurality of initial synchronizing signals 13. Immediately following synchronizing signals 13 is a first or leading beginning of data (BOD) indicator 14. Indicator 14 includes a leading resynchronization signal R followed by two BOD marker signals A. As will become later apparent, a byte counter has the count of $K = 0$ at the end of the resynchronization signal, i.e., the end of the resynchronization signal signifies a reference point in the data record preamble whereat signal framing circuits are synchronized to the format of the record. Following the first occuring marker signal A, byte counter has $K = 1$; following the second marker signal A, byte counter has a count of $K = 2$. In all of the BOD indicators, the byte count $K = 2$ signifies the beginning of either of a synchronization signal burst or beginning of the data area.

A set of synchronizing signals 15 follows the first BOD indicator 14. In turn, second BOD indicator 16 follows the synchronizing signals 15. In this regard, the duration of synchronizing signals 13 and 15 are preferably of the same length, such that the number of signal cycles between the resynchronization signal R in BOD indicator 14 and the resynchronization signal R in BOD indicator 16, as well as other resynchronization signals in the preamble, is constant. Such a selection simplifies both the recording and readback apparatus. The end of the synchronizing signals 15 results in a byte count of $K = 2^N - 1$ which is the modulus of control counters, as later described. The second BOD indicator 16 has a leading resynchronization signal R followed by two BOD marker signals B. The end of the second BOD indicator 16 is signified by byte count $K = 2$. Synchronizing signals 17, having the same number of cycles as synchronizing signals 13, 15, follow the second BOD indicator 16. The duration of synchronizing signals 13 may be made the duration of signals 15, 17 plus the duration of a pointer signal, i.e., signals 13 may have two more bytes or signals.

The last BOD indicator 18 includes a resynchronization signal R followed by one each of the A and B BOD marker signals. The actual BOD occurs at byte count $K = 2$ at the trailing edge of BOD indicator 18, as at 19.

Examination of the three illustrated BOD indicators 14, 16, 18, show unique patterns in each BOD indicator. The RAA signifies a first distance between its $K = 2$ count at 20, and the BOD location 19. Similarly, the second BOD indicator 16 patterned RBB signifies a second predetermined distance between its $K = 2$ count at 21 to BOD location 19. Similarly, BOD indicator 18 indicates immediate proximity to BOD. Also, a fourth BOD indicator RBA (not shown) could be used for providing further enhancement for locating BOD 19. The ensuing description assumes operation with a record member format shown in FIG. 2.

Figure 2:
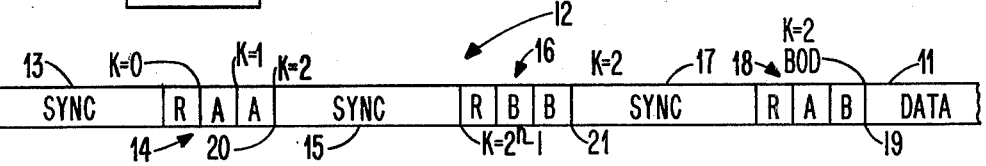
FIG. 2 is a diagrammatic showing of a record member with a preamble constructed in accordance with the present invention.
Figure 3:
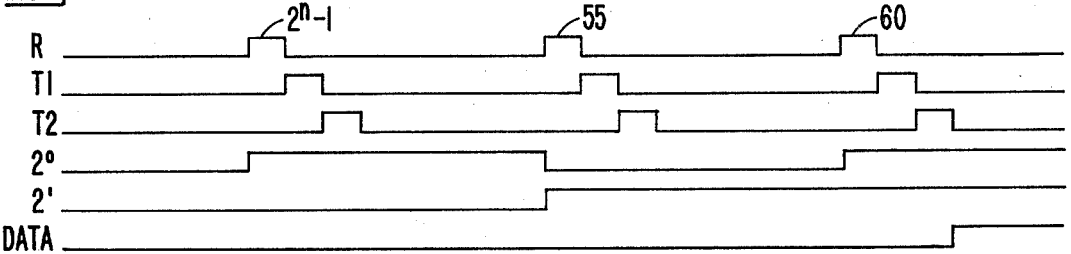
FIG. 3 is a set of idealized wave forms indicating the signal operation of the FIG. 1 illustrated circuits.

The recording of the FIG. 2 illustrated format on a record medium 10 via a magnetic recording transducer 25 is achieved by the FIG. 1 illustrated recording circuits. In this regard, the Irwin U.S. Pat. No. Re 28,265 incorporated herein by reference, shows a write control circuit in his FIG. 6. FIG. 1 of the present application can be incorporated in preamble control 137 of Irwin supra. A write clock from Irwin supra supplied over line 136, a write indicating mode of operation supplied over line 135, and a start signal supplied over line 138 initiate operation of the present illustrated circuits in FIG. 1 of this application. These three signals activate interval counter 26. Interval counter has a modulus of $2^N - 1$, such that number of signal bytes between successive resynchronization signals R is a constant $2^N - 1$ signal periods or cells. Interval counter 26 includes count decodes for supplying a plurality of control signals for sequencing FIG. 1 illustrated circuits. The onset of recording presets interval counter 26 to $K = 2$. Accordingly, synchronization signals 13 are first recorded without any preceding BOD indicators, no limitation thereto intended. At the count $2^N - 1$, a first resynchronization signal R is recorded. This action is signified by a decoded count signal supplied over line 27 to recording circuit 28. Simultaneously the line 27 signal also triggers control trigger 29 to the active condition. Triggers 29, 30 were initially reset by means not shown. This action is shown in FIG. 3 by the signal $2^0$ going positive at time $2^N - 1$. Recording circuits 28 include an encoder responsive to the line 27 signal to generate a resynchronization signal pattern, such as shown by Bailey et al in U.S. Pat. No. 3,641,526.

Interval counter 26 also emits timing pulses T1, T2, respectively, over lines 31, 32 for generating the first and second marker signals following each of the resynchronization signals R in each BOD indicator. This action is achieved via the AO circuits 35, 36 which decode the trigger 29, 30 states and respond to the signals T1, T2, for generating A and B indicating signals respectively over lines 37 and 38. In this regard, the AO circuit 35, A1 input portion generates the two A marker signals for BOD indicator 14. The lines 31, 32, T1, T2 signals are combined in OR circuit 40 which supplies both signals successively over line 41 to the A1 input portion of AO circuit 35. Other inputs to the A1 input portion include data latch 42 signal indicating it is reset, the set signal from $2^0$ trigger 29 received over line 43 and the reset signal $2^1$ trigger 30, received over line 44.

Recording circuits 28 respond to the output of AND circuit 45 signifying that no BOD indicator is being recorded at not data time (data latch 42 is reset) to record synchronization signals. Data latch 42 supplies such a non-data control signal to recording circuits 28 over line 42A. AND circuit 45 responds to the NOT signal from NOT circuit (inverter) 46 responding to the output of the OR 40 signal and the NOT signal from inverter 47 activated by the line 27 signal R to signify to recording circuits 28 over line 48 that synchronization signals are to be recorded. In this regard, data latch 42 is reset by the new record signal received over line 50 from control circuits (not shown) beyond the scope of the present description. After recording BOD indicator 14 recording circuits 28 record synchronizing signals 15.

After the second $K = 2^N - 1$ count occurs as at 55, BOD indicator 16 is recorded. The resynchronization signal R is first recorded by circuits 28 being actuated by the signal on line 27, followed by two B marker signals actuating circuits 28 by the A1 input portion of AO circuit 36, supplying two successive signals over line 38 to recording circuits 28. Recording circuits 28 respond to AND circuit 45, and the line 42A signal as aforedescribed. A1 input portion of AO 36 also receives the two T1, T2 pulses via line 41 and decodes the triggers 29, 30 signal states triggered over lines 56 and 57 (line 27 signal had trigger 29 to the reset state) line 42A signal and the timing pulses T1, T2 over line 41. Since trigger 30 follows the state of trigger by $2^N - 1$ count, the signal states of the two triggers are still opposite, trigger 29 being reset and trigger 30 being set to signify the second BOD indicator 16 is to be recorded.

Following the $K = 2$ time at 21, synchronization signals 17 are recorded by recording circuits 28. Such time is indicated by AND circuit 45 as previously described. Finally, at the third $2^N - 1$ byte count as at 60, BOD indicator 18 is recorded. The line 27 signal activates recording circuits 28 to record the resynchronization signal R as well as triggering trigger 29 from the reset state to the set state. Trigger 30 remains in the set state. Both triggers 29, 30 being set to the active condition signify that BOD indicator 18 is to be recorded. In this regard, the A2 input portion of AO 35 actuates recording circuits 28 to record the first BOD marker signal A. This action is achieved by A2 input portion responding to the T1 signal received over line 31, the trigger 29 set signal received over line 43, the trigger 30 set signal received over line 56 and the NOT data signal received over line 42A. Similarly, at time T2, the timing signal on line 32 actuates the A2 input portion of AO 36 to supply a B indicating signal to recording circuits 28. The other inputs to the A2 input portion include the set signal from trigger 29 received over line 43. The set signal from trigger 30 received over line 56 and the NOT data signal received over line 42A.

Since BOD indicator 18 signifies beginning of data, data latch 42 must be set to the data indicating condition. To this end, AND circuit 61 sets data latch 42 when inverter circuit 47 indicates T1 and T2 are absent. Inverter 47 indicates the resynchronization signal on line 27 is absent and triggers 29, 30 are set to the active condition. As soon as data latch 42 is activated, a data indicating signal travels over line 62, actuating data signal source 63 to supply data signals to recording circuits 28 for recording on medium 10. A clock (not shown) synchronizes operations of recording circuits 28 and data signal source 63 in a known manner. In addition to the BOD indicators shown in FIG. 2, the data recording portion 11 of the record may have interleaved resynchronization signals all constructed in accordance with the documents incorporated by reference.

The actual signal construction of markers R, A, and B can be any arbitrary recognizable pattern. In accordance with the recording format selected for recording data signals in area 11, it is prefered that all three marker signals have longer wave lengths within the legal data frequencies as taught by Bailey supra, no limitation thereto intended.

The successful recovery of signals recorded on medium 10 is achieved by the FIG. 4 illustrated circuits receiving readback signals from readback transducer 65. A usual data signal detector 66 converts the readback signals into data indicating form as supplied over line 67 indicated by detected data DD and supplies readback circuit synchronizing signals C over line 68 as indicated. Generally, signals C have one active signal per signal unit, i.e., one signal per bit. In a constructed embodiment, a byte consists of nine successive bit signals in a serial recording channel. In the event of parallel signal channels such as taught by Irwin supra, a single time may indicate a byte, such byte should be deskewed as shown by Irwin for the various independent signal channels. For a serial channel, the line 67 DD signals are deserialized in shift register deserializer 69. Deserializer 69 also includes a decoder (not shown) for recognizing a resynchronization signal that has been deserialized. Such resynchronization detection may follow the teaching of the pattern detectors of Bailey, supra. The output signals of such decoders are supplied over line 70 as a resynchronization detected signal RD. Such signal alerts format detector 73, as will be described later with respect to FIG. 5.

As in the recording circuits the illustrated readback circuits also include an interval or byte counter 74 for measuring the signal spacings between the leading edges of BOD indicators 14, 16, and 18. Clock signals C on line 68 activate byte counter 74 for signifying the counts $K = 0, 1$ and 2 for use by format detector 73. The counter 74 is reset to the reference state by format detector 73 via the GC signal transferred over line 75, as will become apparent. Format detector 73 operation is time by the C signals on line 68.

The deserialized data DSD from deserializer 69 is supplied over a 9 bit wide cable 75 to demodulator 76. Deserialized data, DSD, consists of the synchronizing signals (preferably all 1's) and the R signal, the A signal, and the B signal for preamble purposes. In the data area 11, DSD represents deserialized data signals.

Demodulator 76 consists of a set of decoders for detecting the R, A, and B data patterns, i.e., long wave lengths and short wave lengths are signified by detected binary 1's and 0's, as indicated by Bailey, supra. Demodulator 76 decoders the A, B, and R signals to supply indications thereof respectively over lines 80, 81, 82, to format detector 73. The data signals D are supplied over nine bit wide cable 83 to nine output gating AND circuit 84. A data gate signal DG received from format detector 73 over line 85 activates the output gating circuits 84 to supply data on output line 86 to a utilization device (not shown). The utilization device can include a channel 30 as shown in Irwin, supra, in his FIG. 2.

The recognition of the BOD indicators 14, 16, and 18 is achieved by the format detector circuits shown in FIG. 5. Format detector 73 includes resync detected latch RDL 90 for controlling counter 74. The RD signal on line 67 sets latch RDL 90 to the active condition. When set, latch 90 supplies a GC signal over line 75 for synchronizing operation of byte counter 74 to the format in medium 10. RDL latch 90 is reset optionally at beginning of data by the DG signal on line 85, by beginning of record signal received over line 85A or other suitable control means not pertinent to the practice of the present invention.

Detection of BOD indicators 14, 16, 18 as initiated by the R signal from demodulator 76 partially enabling AND circuit 92, circuit 92 passes the $K = 0$ signal received over line 93 from byte counter 74 to set RL latch 91 to the active condition. RL latch signifies resync. The RL signal from latch 91 travels over line 94 to all three decoding AND circuits, 95 which decodes RAA (first BOD indicator 14), AND circuit 96 which decodes RAB (third BOD indicator 18), and AND circuit 97 which decodes RBB (second BOD indicator 16). The just-described decoder activates a pair of BOD detecting triggers T1 100, and T2 102. A set of OR circuits, later described, couple decoder 95, 96, 97, to decoding triggers 100 and 102. BOD error compensating circuit 103 responds to the signal states of triggers 100, 102, and to the $K = 2$ signal on line 104 to compensate for missed BOD indicators 14, 16 or 18. It will be remembered that the $K = 2$ signal on line 104 signifies the trailing edges of the BOD indicators 14, 16, 18. Accordingly, all action of format detector 73 is keyed to this timing pulse.

The resynchronization latch RL 91 activates AND circuit 95 in conjunction with the A signal received over line 80, the AL signal received from AL latch 106 (as will be later described), and the $K = 2$ signal on line 104. The AND circuit 95 output signal travels through OR circuits 107, 108, respectively, to reset latch 102 and set latch 100, hence, the RAA or first BOD indicator 14 is signified by latch 100 being set and latch 102 being reset. This is indicated in FIG. 6 respectively by the signals L1, L2 at time RAA.

AL latch 106 is set to the active condition by AND circuit 110 responding to the A signal received over line 80 and the $K = 1$ signal received over the line 111 from byte counter 74.

The second BOD indicator 16 RBB is detected by AND circuit 97. First, the B signal received over line 81 sets BL latch 113 via AND circuit 114 at time $K = 1$. The AND circuit 97 decodes RBB by responding to the BL latch 113 being set, the B signal on line 81, the RL latch being set as indicated by the signal on line 94, at time $K = 2$ as indicated by the signal on line 104. The decoded RBB BOD indicator signal is supplied by AND circuit 97 through a pair of OR circuits 116, 117 to respectively reset trigger 100 and set trigger 102. Such action is indicated in FIG. 6 at time RBB. Therefore, latch 102 being set and latch 100 being reset signifies the second BOD indicator 16.

Finally, the last BOD indicator RAB is detected by AND circuit 96. AND circuit 96 receives the line 81 B signal, the latch RL 94 signal, the latch AL signal and the $K = 2$ signal to set both triggers 100 and 102 to the active condition via OR circuits 108, 117. Both latches 100, 102 being set to the active condition signify beginning of data as indicated in FIG. 6 at time RAB.

The above description assumes no error condition in the preamble, i.e., no BOD indicators 14, 16, or 18 were missed because of obliteration or loss of clock sync.

Operations of the FIG. 5 illustrated circuit for a missing RAA BOD indicator is shown in FIG. 7. The L1, L2 signals respectively represent the signal states of triggers 100, 102, it should be noted that the condition at RBB is the same for the normal condition as shown in FIG. 6 for no missing first BOD indicator 14. Accordingly operation of the format detector is the same as described for normal operations. In the event the second BOD indicator 16 is missing, the action shown in FIG. 8 occurs. The L1 trigger 100 remains set while at time RAB AND circuit 96 sets trigger 102 to the active condition for completing detection of BOD in a normal manner, i.e., without using recovery circuit 103. However, in FIG. 9, the action of format detector 73 is shown with a missing third BOD indicator 18. At this time, an exclusive OR function of circuit 103 sets trigger 100 to the active condition. The exclusive OR function is achieved by the AND circuit 120 supplying signals through inverter 121 indicating that latches 100 and 102 are not both set. While OR circuit 122 signifies that at least one of the two triggers 100, 10s are set, AND circuit 123 combines these two indications at time $K = 2$ by the signal received over line 104 to trigger latch 100. Triggering latch 100 changes it from the reset state to the set state for indicating BOD. Similarly, as shown in FIG. 8, the exclusive OR action resets trigger 100 at time RBB for reconstructing the desired control signals in the preamble for triggers 100, 102.

FIG. 10 illustrates operation of the format detector 73 when both BOD indicators 14 and 16 are absent. In this case, reliance is placed solely on the third BOD indicator 18 as indicated by the action at RAB. In such dire error conditions, the single BOD indicator 18 can still achieve beginning of data signal indication. Accordingly, the described article and the associated data recorder circuits provide multiple indications of BOD which are independent, i.e., any one can indicate BOD when all of the remaining indicators are obliterated. Or, there is coaction between the various indicators for reconstructing successful BOD indication, such as shown in FIGS. 8 and 9.

Resynchronization signals R may consist of various patterns for indicating location thereof in the preamble.

Then combination of signal patterns in the resynchronization and marker signals yield a greater number of BOD pointers. Of course, single byte pointers may also be employed. The present invention is applicable to all forms of data communication systems, electrical, radio, optical, wide band, narrow band, FSIC, etc.

While the invention has been particularly shown and described with reference to preferred embodiments thereof, it will be understood by those skilled in the art that various changes in form and details may be made therein without departing from the spirit and scope of the invention.

What is claimed is:

1. A magnetic recorder for operating with a magnetic record member having a data record area preceded by a preamble area having synchronizing signals with interviewed beginning of record indicating signals;

the improvement including in combination:
means for initiating operation of the recorder for sensing said preamble signals;
means in said recorder for detecting that a beginning of data indicator is being sensed;

control means responsive to a plurality of said beginning of data indicators to indicate beginning of data in accordance therewith;

beginning of data indicating recovery means responsive to said sensing means to indicate beginning of data when any one of said plurality of beginning of data indicators is reliably sensed; and said sensing means includes common pattern in all of said beginning of data indicators to signify that a beginning of data indicator is being sensed.

2. The apparatus set forth in claim 1 further including in combination:

decoder means responsive to a plurality of said beginning of data indicators to indicate which beginning of data indicator is being sensed; and BOD control means responsive to said decoder means to indicate location within said preamble of a last sensed beginning of data indicator.

3. The apparatus set forth in claim 1 further including in combination:

a plurality of decoding means in said decoder responsive to said common sensing means to detect a beginning of data indicator; and a plurality of beginning of data indicating latches supplying signals to said plurality of decoders for actuating same to indicate location of said beginning of data indicators in said preamble.

4. The apparatus set forth in claim 1 wherein said recovery circuit includes EXCLUSIVE OR means responsive to said beginning of data indicators for resetting same to indicate beginning of data whenever a beginning of data indicator is missed.

5. A recording circuit for magnetic recorder for recording preamble signals to precede a data record area, a set of recording circuits including means for generating a plurality of synchronizing signals and encoding means for encoding any one of a plurality of marker signals;

including in combination:

an interval counter for indicating signal position with any predetermined interval of signal cycles, said counter supplying a first signal for indicating a resynchronization position to said recording circuits for actuating same to record a resynchronization signal;

secondary counter means responsive to signals from said interval counter for indicating one of a plurality of locations within said preamble as a interval number of said intervals; and encoding means responsive to said interval counter and to said secondary counter for actuating said recording signal circuits to record a plurality of marker signals in operative association with said resynchronization signal, all in accordance with the number of intervals counted by said interval counter.

6. The apparatus set forth in claim 5 wherein said secondary counter actuates said encoder in a predetermined binary pattern for repetitively using marker signals for indicating precise locations preceding a data record area.

7. An electrical circuit for operating with a data signal encoder adapted to exchange signals with a record member, said electrical circuit adapted to actuate said recorder to exchange preamble signals with said record member, in combination:

R means indicating a resynchronization signal, A means indicating an A marker signal, K means indicating signal counts exchanged between said recorder and said record member;

circuit means responsive to said R means, A means, and K means to signify a plurality of beginning of data indicating locations; and signal transfer means in said recorder responsive to said circuit means to initiate a data signal exchange between said recorder and record member.

8. The electrical circuit set forth in claim 7 further including B means indicating a B marker signal; and said circuit means being further responsive to said B means to signify a plurality of beginning of data indicating locations.

9. The circuit set forth in claim 8 wherein said K means includes means responsive to said R means for presetting a count to a predetermined count and counting signals exchanged subsequent to said reference state; and said circuit means including decoder means responsive to said K means indicating a first count to signify said R means indicated signal, responsive to a second count to indicate an A means indicated signal, and to a third count to indicate a B means indicated signal, and further responsive to said third count, indicating location of said sensed signals within said preamble.

* * * * *